3,314,808
STABILIZED CELLULOSE ESTER
Gordon Mars Moulds, Waynesboro, Va., assignor to E. I. du Pont de Nemours and Company, Wilmington, Del., a corporation of Delaware
No Drawing. Filed Mar. 2, 1964, Ser. No. 348,872
3 Claims. (Cl. 106—183)

This invention relates to stabilized cellulose ester compositions.

Stabilization of polymers in general has been studied over the years. It has been found that stabilizers useful with one polymer under one set of conditions are often unsuitable with the same or different polymer under other conditions of temperature, atmosphere, shear, etc., or combinations thereof. C. E. Schildknecht in "Polymer Processes," page 525 (1956), states "The technology of polymer stabilization remains highly empirical, the fundamental chemistry being yet obscure in many cases." It is clear that improved stabilizers for cellulose acetate are still needed.

Cellulose esters as prepared in the conventional manner from wood pulp or cotton linters tend to undergo discoloration and chain-cleavage at high temperatures. The chain-cleavage causes a reduction in physical properties of the cellulose ester, particularly tensile properties. Also, over long periods of time there may be evidence of deterioration of the esters. A deterioration of either type is a decided disadvantage in the use of cellulose esters, particularly in situations involving elevated temperatures, such as in molding; and consequently, methods have been developed over the years for stabilizing those esters against the effects of elevated temperatures.

Many stabilizers have been suggested for use with cellulose acetate, see the aforementioned "Polymer Processes," page 531, and recent U.S. Patents 2,713,546 and 2,805,171, and in particular, stabilizers of the type proposed for the purposes of this invention are disclosed in combination with other polymers in Monsanto Chemical Company Technical Bulletin of Apr. 1, 1961, on the stabilization of polypropylene and U.S. Patent 3,033,814.

This invention provides cellulose esters and compositions thereof stabilized against the effect of heating in an oxygen-containing atmosphere. This invention also minimizes the objectionable discoloration which occurs when cellulose esters are exposed to elevated temperatures. Furthermore, this invention provides cellulose acetate compositions having good stability at high temperatures, such as 225° C. and under shearing conditions. Other advantages will be apparent from the following detailed description.

The advantages of this invention are attained by incorporating in cellulose esters a stabilizing amount of a diester of 3,3'-thiodipropionic acid and a bisphenol having the formula:

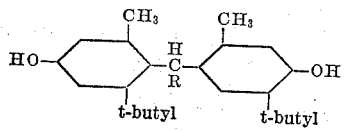

wherein R is a lower alkyl radical. It has been discovered that an unusual degree of stabilization results even when the stabilized cellulose ester composition is exposed to temperatures of 225° C. for periods of 20 minutes under conditions of high shear, such as on heated milling rolls. It is found that the two stabilizers specified produce a synergistic effect, in that the improvement in discoloration resistance of the cellulose ester with the combination of stabilizers is greater than that expected from the simple additive effects of the two stabilizers used separately.

Suitable diesters of 3,3'-thiodipropionic acid for the purposes of this invention have the following formula:

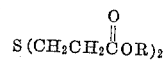

wherein R is an alkyl radical having at least 4, and generally 4 to 20, carbon atoms. R preferably contains from 8 to 18 carbon atoms. A particularly effective diester has 12 carbon atoms for the R substituents, that is, the diester is the compound dilauryl 3,3'-thiodipropionate. However, any diester of 3,3'-thiodipropionic acid as described above can be employed in the present combination. Illustrative diesters include the hexyl, octyl, decyl, myristyl, cetyl, and stearyl diesters of 3,3'-thiodipropionic acid, or mixtures thereof.

The bisphenols useful in the present invention embrace those defined by the structural formula given hereinabove. Examples of suitable bisphenols are 4,4'-butylidenebis-(6-t-butyl-m-cresol), 4,4' - ethylidenebis(6 - t - butyl-m-cresol), and 4,4-propylidenebis(6-t-butyl-m-cresol). Preferably the alkylidene group contains from one to about four carbon atoms. 4,4'-butylidenebis(6-t-butyl-m-cresol) is particularly preferred in the practice of this invention.

The cellulose esters to which this invention pertain are the conventional organic cellulose esters (simple or mixed) of aliphatic acids, such as cellulose acetate, cellulose propionate, cellulose acetate butyrate, cellulose acetate sorbate, and the like. The cellulose acetate can be prepared by the known procedures for acetaylating cellulose in the presence of sulfuric acid. The cellulose acetate that can be used generally has a substitution equivalent between 50% and 62% combined acetic acid. Those cellulose acetates having a substitution equivalent between 52% and 57% combined acetic acid are preferred.

The stabilizers of this invention may be added to the cellulose ester at any time subsequent to the formation of the ester and prior to its exposure to an elevated temperature. A desirable and preferred method of adding the stabilizers involves adding them as a powdered mixture to the dried cellulose ester flake prior to grinding to the desired size.

Although extremely small amounts such as 50 parts per million of each stabilizer confer some beneficial effect in stabilizing the cellulose ester, generally the stabilizers of this invention are each used in amounts ranging from about 100 to about 2,000 parts per million by weight based on the cellulose ester. Larger amounts of the stabilizers may be used, but such use is economically undesirable. With cellulose acetate, approximately equal amounts in the range from 200 to 500 parts per million of each stabilizer are preferred.

Conventional stabilizers may be incorporated in the cellulose ester compositions of the invention. For example, the known nonvolatile epoxy-type compounds compatible with the cellulose esters may be employed. A suitable epoxy-type compound contains at least one epoxy group or oxirane ring and, preferably, no atoms other than carbon, hydrogen, and oxygen. Suitable materials are epoxidized oils, for example, peanut oil and cottonseed oil, and organic polyglycidyl compounds, such as the condensation products of epichlorohydrin and bisphenols. In addition to the epoxy compounds, small amounts of organic acids, e.g., citric acid, may advantageously be present.

Cellulose esters stabilized in accordance with the present invention are useful in spinning operations to make fibers for fabrics or textile materials which are valuable under conditions of severe heat, such as in electrical insulation or the like. For yarn making no plasticizer is needed. For making sheeting, coatings, or molded articles, the addition of a plasticizer, e.g., diethyl phthalate, is desirable. Highly plasticized compositions may be subjected to elevated temperatures and formed into a variety of articles by slush casting. Various articles may also be made from molding powders containing cellulose acetate flake by both injection molding and compression molding procedures using elevated temperatures and pressures. Such articles include motor housings, electrically lighted ornaments, household articles, bathroom articles, and toys.

This invention will be further illustrated but is not intended to be limited by the following examples in which parts and percentages are by weight based on cellulose acetate unless otherwise specified. In the following examples, the stability of the cellulose ester compositions was determined by a stringent test involving the use of heated milling rolls which are open to the atmosphere. A cellulose acetate sample is melted and worked for 20 minutes on a pair of rolls heated to a surface temperature of 225° C. The two rolls, each having a diameter of 6 inches, rotate at different speeds so as to produce substantial shear-type work on the sample being tested. The speed ratio of the two rolls is set at 1.4:1. After being worked, the sample is added to acetone to provide a 10% solution by weight, any plasticizer present being considered part of the solvent. The mixture is agitated overnight, and the color value of the solution is determined by measurements in a Beckman Model B spectrophotometer, the cell having a length of one centimeter. Absorption at 440 and 640 millimicrons is determined, and the color value (C) is calculated by the formula:

$$C = 1 - \frac{\text{Percent transmission at 440 millimicrons}}{\text{Percent transmission at 640 millimicrons}}$$

The viscosity of the solution is determined by means of a Brookfield viscometer.

EXAMPLE I

Cellulose acetate flake containing 55.7% combined acetic acid and ground to 70-mesh fineness is mixed with the following ingredients:

|  | A | B | C |
|---|---|---|---|
| Cellulose acetate | 100 | 100 | 100 |
| Diethyl phthalate | 50 | 50 | 50 |
| 4,4'-butylidenebis(6-t-butyl-m-cresol) | 0.02 | | 0.005 |
| Dilauryl 3,3'-thiodipropionate | | 0.02 | 0.005 |
| Color after heated-roll test | 0.33 | 0.39 | 0.19 |

Sample C containing both stabilizers is extruded into film, and the film is heated to 175° C. for three hours. The film retains exceptional toughness and shows very low color formation.

EXAMPLE II

Other samples of raw cellulose acetate flake described in Example I are compounded with the following ingredients:

|  | A | B | C | D |
|---|---|---|---|---|
| Cellulose acetate | 100 | 100 | 100 | 100 |
| Diethyl phthalate | 50 | 50 | 50 | 50 |
| Commercial Stabilizer A-5 (an organic polyglycidyl composition) | 0.1 | 0.1 | 0.1 | 0.1 |
| Citric Acid | 0.01 | 0.01 | 0.01 | 0.01 |
| 4,4'-butylidenebis(6-t-butyl-m-cresol) | 0.05 | | 0.02 | |
| Dilauryl 3,3'-thiodipropionate | | 0.05 | 0.02 | |
| Color after heated-roll test | 0.10 | 0.14 | 0.08 | 0.28 |

Before being milled on the heated rolls, Sample D has a color value of 0.05. From the values of 0.10 and 0.14 for Samples A and B, a theoretical color value of 0.12 would be deduced for a sample containing 0.025 part of each additive. The data, showing an actual color value of 0.08 for a sample containing only 0.02 part of each stabilizer, demonstrates the synergism of the stabilizer combination.

Viscosity data of these samples are given below, where synergism is also indicated.

Brookfield viscosity (poises):
A --------------------------------------- 2.76
B --------------------------------------- 1.52
C --------------------------------------- 2.84
D --------------------------------------- 1.00

As in Example I, extruded film prepared from sample C when heated to 175° C. for three hours displays very low color formation and a high degree of toughness.

What is claimed is:
1. A composition of matter comprising a major amount of a cellulose ester and a stabilizing quantity of a dialkyl ester of 3,3'-thiodipropionic acid wherein each alkyl group contains from 4 to 20 carbon atoms and a bisphenol having the formula

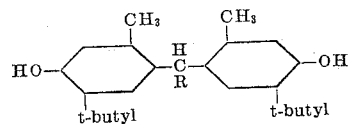

wherein R is a lower alkyl radical of from one to about four carbon atoms.

2. A composition comprising a major amount of cellulose acetate and a stabilizing amount of dilauryl 3,3'-thiodipropionate and 4,4' - butylidenebis - (6-t-butyl-m-cresol).

3. The composition of claim 2 wherein the stabilizers are each present on a weight basis, in an amount in the range of between 200 and 500 parts per million parts of the cellulose acetate.

References Cited by the Examiner
UNITED STATES PATENTS

| | | | |
|---|---|---|---|
| 2,746,958 | 5/1956 | Pyle | 106—189 XR |
| 2,849,325 | 8/1958 | Lincoln | 106—189 |
| 2,887,396 | 5/1959 | Krajewski et al. | 106—189 XR |
| 2,917,398 | 12/1959 | Coover et al. | 106—189 XR |
| 2,928,795 | 3/1960 | Tinsley | 106—189 XR |
| 3,033,814 | 5/1962 | Tholstrap | 260—45.85 |
| 3,204,014 | 8/1965 | Green | 260—45.85 XR |

ALEXANDER H. BRODMERKEL, *Primary Examiner.*

ROBERT F. WHITE, *Examiner.*

J. H. WOO, *Assistant Examiner.*

UNITED STATES PATENT OFFICE
CERTIFICATE OF CORRECTION

Patent No. 3,314,808 April 18, 1967

Gordon Mars Moulds

It is hereby certified that error appears in the above numbered patent requiring correction and that the said Letters Patent should read as corrected below.

Column 1, line 61, the left-hand portion of the formula should appear as shown below instead of as in the patent:

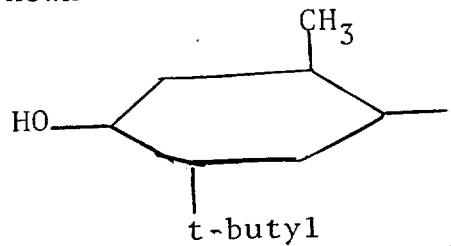

Signed and sealed this 7th day of November 1967.

(SEAL)
Attest:

Edward M. Fletcher, Jr.
Attesting Officer

EDWARD J. BRENNER
Commissioner of Patents